United States Patent
Agarwal et al.

(10) Patent No.: US 11,295,165 B1
(45) Date of Patent: Apr. 5, 2022

(54) SYSTEMS, METHODS, AND APPARATUSES FOR DETERMINING DATA RELEVANCE AND LABELING, MODEL UPDATING, AND DEPLOYMENT

(71) Applicant: Amazon Technologies, Inc., Seattle, WA (US)

(72) Inventors: Vinayak Ashutosh Agarwal, Newark, CA (US); Jason Lenox Copeland, Mountain View, CA (US); Matthew James Wood, Seattle, WA (US); Long Gao, San Jose, CA (US); Ricardo Elizondo Costa, Seattle, WA (US); Jiajun Sun, Sunnyvale, CA (US); Naga Krishna Teja Komma, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 16/587,400

(22) Filed: Sep. 30, 2019

(51) Int. Cl.
*G06N 20/00* (2019.01)
*G06K 9/62* (2022.01)
*G06K 9/00* (2022.01)

(52) U.S. Cl.
CPC ....... *G06K 9/6256* (2013.01); *G06K 9/00979* (2013.01); *G06K 9/627* (2013.01); *G06K 9/6262* (2013.01); *G06N 20/00* (2019.01)

(58) Field of Classification Search
CPC .................. G06K 9/6256; G06K 9/00979
See application file for complete search history.

(56) References Cited

U.S. PATENT DOCUMENTS

2018/0315225 A1* 11/2018 Zhang .................... A61B 6/037
2020/0344411 A1* 10/2020 Cragg ................ H04N 5/23218

* cited by examiner

*Primary Examiner* — Tuan H Nguyen
(74) *Attorney, Agent, or Firm* — Nicholson De Vos Webster & Elliott LLP

(57) ABSTRACT

Techniques for training a machine learning model based on captured images are described. A method described include filtering a first set of collected images using one or more machine learning models; labeling the first set of filtered, collected images using a data labeling service using a service of the provider network; training a machine learning model from a machine learning algorithm using the first set of filtered, collected images using a service of the provider network; and causing deployment of the trained machine learning model onto a device.

20 Claims, 17 Drawing Sheets

CONFIGURE FILTERING

FILTERING CONDITION 1 803

SELECT A FILTERING CONDITION

| | |
|---|---|
| TIME INTERVAL | 811 |
| CUSTOM MODEL | 813 |
| FEATURE DETECTION | 815 |
| OBJECT DETECTION | 817 |
| PERSON/ANIMAL DETECTION | 818 |
| MOTION DETECTION | 819 |

FILTERING CONFIG GUI 801

*FIG. 8*

CONFIGURE FILTERING

FILTERING CONDITION 1 803

SELECTED FILTERING CONDITION 903

OBJECT DETECTION

EDIT CLASSES 911

CONFIDENCE THRESHOLD

% 909

ADD ANOTHER CONDITION 905

CREATE PACKAGE 907

FILTERING CONFIG GUI 901

*FIG. 9*

PACKAGE DETAILS

NAME

PACKAGE INFORMATION

STORAGE LOCATION

| STORAGE LOCATION PATH | 1105 |

FILTERING CONDITION(S)

| OBJECT DETECTION OR TIME INTERVAL | 1107 |

MODEL INFORMATION

| CREATE MODEL/MODEL | 1109 |

PACKAGE CONFIG GUI 1100

*FIG. 11*

SPECIFY MODEL DETAILS

MODEL DETAILS

MODEL NAME
[1205]

DESCRIPTION
[1207]

MODEL CONFIG GUI 1200

*FIG. 12*

SYSTEMS, METHODS, AND APPARATUSES FOR DETERMINING DATA RELEVANCE AND LABELING, MODEL UPDATING, AND DEPLOYMENT

BACKGROUND

Building production-ready machine learning (ML) models and improving them over time is a time-consuming process for businesses today as there are many undifferentiated intermediate steps, which are technically involved and thus require input from data scientists.

BRIEF DESCRIPTION OF DRAWINGS

Various embodiments in accordance with the present disclosure will be described with reference to the drawings, in which:

FIG. 8 illustrates embodiments of a graphical user interface (GUI) to be used to configure image filtering.

FIG. 9 illustrates embodiments of a GUI to be used to configure image filtering.

FIG. 11 illustrates embodiments of a GUI to be used to configure a package.

FIG. 12 illustrates embodiments of a GUI to be used to configure a model.

DETAILED DESCRIPTION

The present disclosure relates to methods, apparatus, systems, and non-transitory computer-readable storage media for image collection, image filtering, image labeling, ML model training, and deployment.

As noted above, building production-ready machine learning (ML) models and improving them over time is a time-consuming process for businesses today as there are many undifferentiated intermediate steps, which are technically involved and thus require input from data scientists. For example, images collected at the edge to the cloud, labeling the images, and optimizing models for the target devices are typically performed manually. In addition, as more images need to be collected to improve ML models, many of these manual steps are repeated multiple times until an accurate ML model is ultimately obtained.

Detailed herein are embodiments for a managed, feedback-loop approach to the generation, optimization, and deployment of ML models that reduces the time and effort required to have a satisfactory ML model. In particular, embodiments of the described approach automatically perform the undifferentiated heavy lifting through the intermediate steps—from collecting images to deploying an optimized model, reducing (or eliminating) the manual effort involved and potentially resulting in a better ML model in the end (for example, removing human labeling for training images and instead relying on images that have been filtered using a reproducible means such as the application of a ML model may result in better training of an ML algorithm as "bad" input is likely to be used and/or how to adjust the filtering may be easier as the result of applying an ML-based filter is reproducible and therefore controllable).

Figure 1:
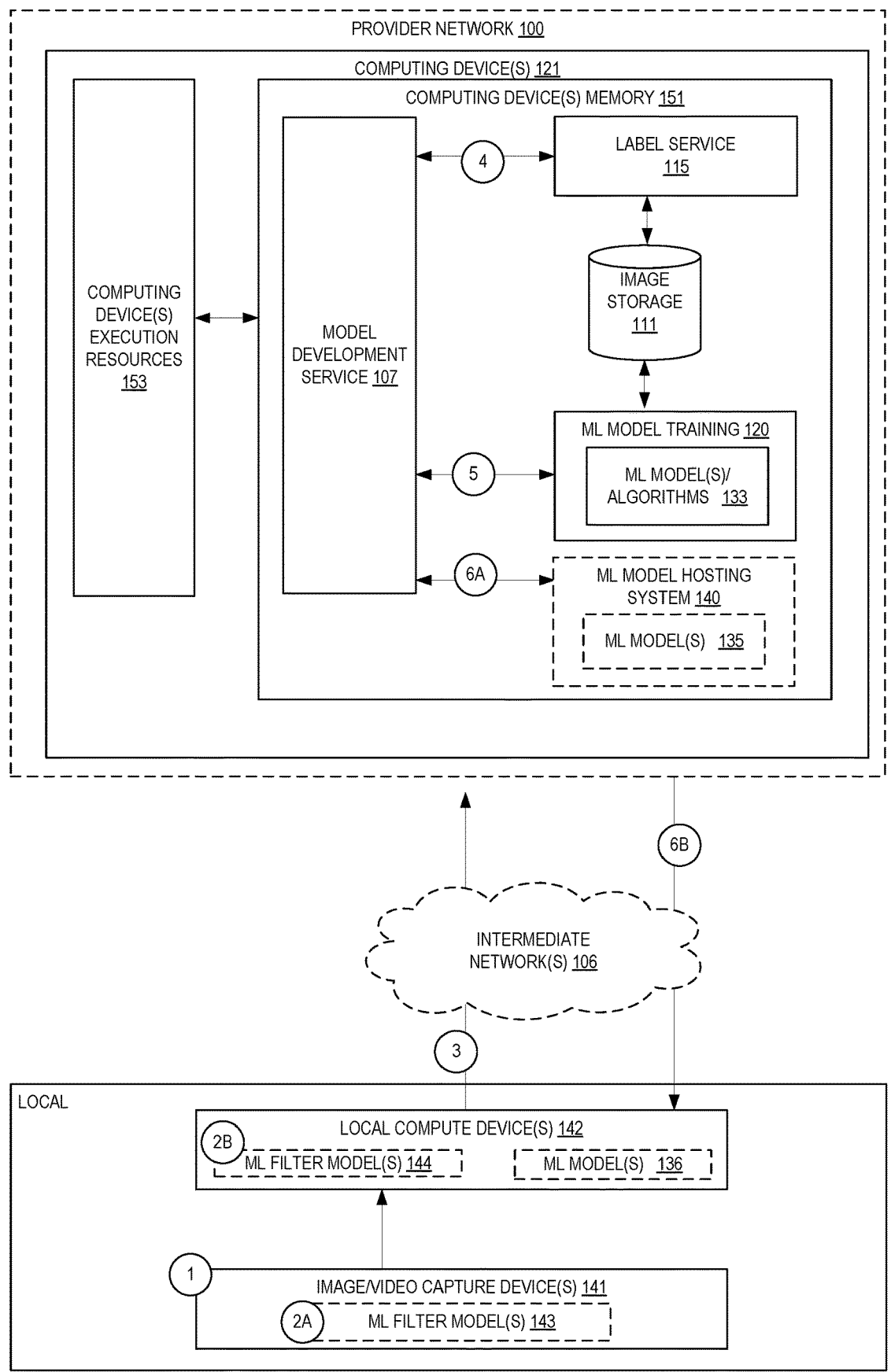
FIG. 1 illustrates embodiments of an environment for image collection, image filtering, image labeling, ML model training, and deployment.

FIG. 1 illustrates embodiments of an environment for image collection, image filtering, image labeling, ML model training, and deployment. As illustrated, an image/video capture device 141 such as a still or video camera captures one or more images to be processed using one or more machine learning models such as ML model(s) 136 or 135 and/or to be used as training data for the generation of ML model(s) 136 or 135. Building image-based ML models first requires collecting images for training as shown in circle 1. One approach is to build ML models using hundreds of images taken from mobile phones, etc. Unfortunately, what is a "good image" is not always known to those taken the images and data scientists are asked to either provide the images or evaluate them. In embodiments detailed herein, cameras coupled to a computing device are used to collect images. These cameras may be configured locally or remotely to set what is to be collected and how much is to be collected. In some embodiments, the configuration of the collection of images such as image/video capture device(s) 141 includes one or more of: an indication of the source of the images (such as the network identifier of a camera), an identification of a destination location for the images, an identification of the camera parameters (for example, the resolution of images, etc.), etc.

Those that are interested in building machine learning models using cameras that collect images continuously, realize that the majority of those images are likely not useful. Investing the resources to transfer all of those images to the cloud and then label all of them is not a best practice as at the very least it is respectful of available network bandwidth. For example, clogging a connection with images that will provide no meaningful impact may cause other network traffic that is impactfully to have latency issues, etc. and then dedicating resources such as humans to label these less-than-impactful images is wasteful. In some embodiments, the captured images are filtered locally such that only a proper subset of images are to be labeled and used for training, inference, etc. For example, if one was only interested in identifying when people smoke at a gas station instead of submitting every image to a machine learning model to find this act, a proper subset of images may be first obtained by filtering out only the images in which humans are present. This allows for the training of ML models that focus only on the highest value "interesting" data or images to be transferred to the cloud for labeling.

In some embodiments, filtering images locally is performed in the image/video capture device(s) 141 using a ML filter model 143 (or models) and/or using one or more local compute devices 142 and one or more ML filter models 144 on those local compute device(s) 142. This is shown in circles 2A and 2B. The configuration of the ML filter models 143 and/or 144 may include many parameters for how to use these models. For example, the parameters may include one or more of: an indication of which ML model(s) to use, an indication of a number of images to keep over an interval, the length of each interval, a maximum number of images to keep, a threshold value to be used to select which images are transferred (for example, the confidence score is greater than the threshold value), a location of where to store the filtered images locally, and/or a location of where to store the filtered images remotely. Examples of ML filter models include those that perform object recognition, activity detection, facial recognition, etc.

In some embodiments, the filtering process does not rely on ML filter models. In some of these scenarios a proper subset of images is kept, and the rest thrown out. The configuration of parameters for this type of process may include one or more of: an indication of a number of images to keep over an interval, the length of each interval, a maximum number of images to keep, a threshold value to be used to select which images are transferred (for example, the confidence score is greater than the threshold value), a location of where to store the filtered images locally, and/or a location of where to store the filtered images remotely.

After collecting and filtering images locally, this subset of images are automatically transferred to a remote location such as computing device(s) 121 at circle 3. The configuration of the local compute device(s) 142 making this transfer includes an indication of the image storage 111 location.

The one or more computing devices 121 comprise a computing device execution resources 153 (such as processors, accelerators, etc.) that execute software stored in computing device(s) memory 151 to provide machine learning-based image processing and/or ML model training. Image/video intake software 103 intakes one or more images (either still or taken from a video), video, or a subset thereof. This intake may include ingestion, storing the one or more images, video, or subset thereof in image/video storage 111 (e.g., a database, local storage, etc.), encrypting the content, and/or indexing video.

In this example, the computing device(s) 121 provides several services or engines. A model development service 107 is used to configure a plurality of services of the computing device(s) 121 and the local compute and/or image capture. For example, the parameters detailed herein are typically provided to the model development service 107 which uses those parameters to call and/or configure services (or engines) and actions. A label service 115 (or engine) to label captured (and in most cases filtered) images to be used to train one or more ML model(s) or algorithm(s) 133. A more detailed example of this type of service is detailed later. A ML model training service 120 (or engine) uses the labeled images to train one or more ML model(s) or algorithm(s) 133. A more detailed example of this type of service is detailed later. Finally, in some embodiments, a trained ML model 135 is hosted in the computing device(s) 121 using a ML model hosting system 150. An example of hosting system is detailed later.

Once the filtered images are available to the remote computation, these images are labeled using the label service 115 (or engine) at circle 4. In most prior scenarios, all images were labeled by a human which is time-consuming and potentially error prone. In addition, often those new to building models did not know how many should be collected to get a desirable machine learning model. As a result, there are situations when weeks are spent collecting and labeling a much larger collection of images than required for a use case. In some embodiments, when the use case is known, ML domain knowledge of the computing device(s) 121 is used to automatically recommend how many images should be collected and labeled to build a satisfactory model. This information is used to inform the image capturing and filtering detailed above. Examples of parameters to be configure the label service 115 (or engine) include one or more of: identifying a labeling problem type/use case (such as bounding box, image classification, text classification, and/or semantic segmentation), an indication of a location of images to label, an indication of a location to store labeled images (or the labels with a pointer to the images), etc. Note in some embodiments, the label service 115 (or engine) requires at least a proper subset of the images to be manually labeled. In some embodiments, labelling is still a manual operation and the label service 115 is not used.

A ML model is trained using the labeled images using the ML model training service 120 (or engine) at circle 5. Model training is naturally an iterative process, but often the machine learning expertise to identify what training parameters need to be changed between iterations to improve machine learning models is lacking. In some embodiments, the model training service 120 reduces the training cycles by automatically tuning the hyperparameters (such as the number of epochs, learning rate, etc.), using the best model architecture (such as SSD, ResNet), and potentially using transfer learning using an existing ML model. Examples of parameters to be configure the ML model training service 120 (or engine) include one or more of: an identification of what framework is used to build the model (e.g., MXNet, TensorFlow, PyTorch, etc.), a base model (if transfer learning is used), a model type (such as ResNet, SSD, etc.), hyperparameters, an indication of what hyperparameters to use (and tune), what hardware instances to use, and/or an indication of where to store a resulting model.

In some embodiments, the ML model training service 120 (or engine) performs model optimization to target a trained model to a particular hardware platform. For example, the trained model is targeted toward a particular CPU, GPU, or APU. Examples of parameters to be configure the ML model training service 120 (or engine) to optimize a trained include one or more of: what framework was used to build the model, where to save the optimized model, and an indication of what the target is.

The model development service 107 may also be used to deploy a trained (and in some cases optimized) model. For example, the model development service 107 may deploy the trained model 135 in a ML model hosting system 140 at circle 6A or in one or more local compute device(s) 142 at circle 6B.

The above acts may be repeated multiple times for various reasons. First, it is often unknown how many images are enough for a "successful" ML model and more images may have to be gathered to improve the ML model. Second, when hardware changes (such as the image/capture device(s) 141), the ML models, trained using different cameras may start to underperform with the new cameras during inference, since ML models are sensitive to changes in camera positioning, lighting, image quality, field of view (FOV), resolution etc.

The model development service 107 may use one or more programmable parameters to decide when to end this loop such as a model accuracy threshold (e.g., shown by the accuracy meeting a threshold), a budgeting threshold, a model accuracy improvement plateau (e.g., shown by the accuracy improvement being minimal), or simply a given time window.

In some embodiments, the computing device(s) 121 are a part of a provider network 100. The provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

Figure 2:
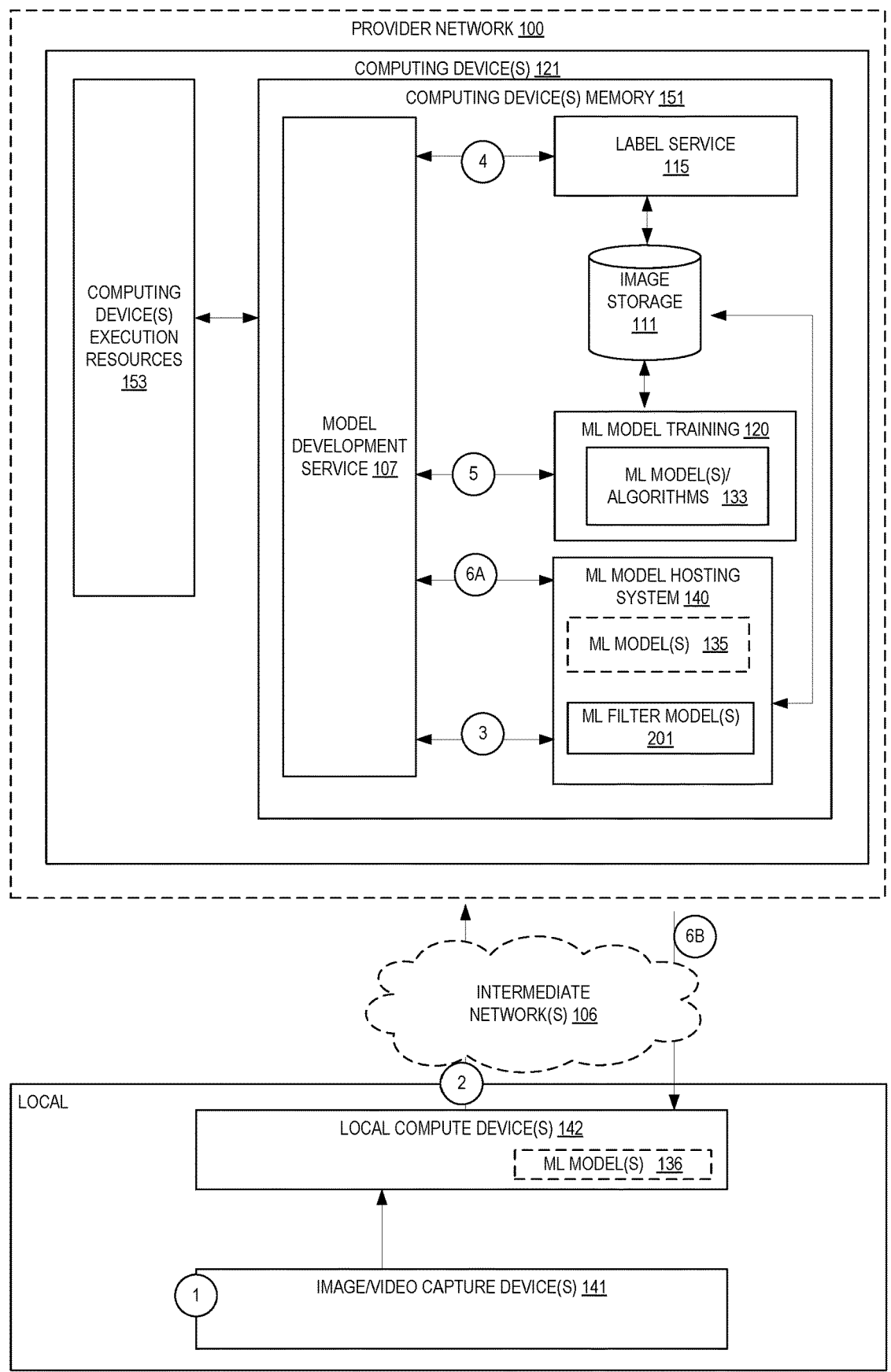
FIG. 2 illustrates embodiments of an environment for image collection, image filtering, image labeling, ML model training, and deployment.

FIG. 2 illustrates embodiments of an environment for image collection, image filtering, image labeling, ML model training, and deployment. This illustration is similar to FIG. 1, but has one major distinction in that the ML filter model(s) 201 are hosted on the computing device(s) 121 instead of being run locally. Again, in some embodiments, the computing device(s) 121 is/are a part of a provider network 100.

The image/video capture device 141 such as a still or video camera captures one or more images to be processed using one or more machine learning models such as ML model(s) 136 or 135 and/or to be used as training data for the generation of ML model(s) 136 or 135 in circle 1. In embodiments detailed herein, cameras coupled to a computing device are used to collect images. These cameras may be configured locally or remotely to set what is to be collected and how much is to be collected. In some embodiments, the configuration of the collection of images such as image/video capture device(s) 141 includes one or more of: an indication of the source of the images (such as the network identifier of a camera), an identification of a destination location for the images, an identification of the camera parameters (for example, the resolution of images, etc.), etc. The captured, unfiltered images are sent to the computing device(s) 121 at circle 2.

In some embodiments, the captured images are filtered remotely using a ML filter model 201 (or models) on computing device(s) 121 at circle 3. The configuration of the ML filter model(s) 201 may include many parameters for how to use these models. For example, the parameters may include one or more of: an indication of which ML model(s)

to use, an indication of a number of images to keep over an interval, the length of each interval, a maximum number of images to keep, a threshold value to be used to select which images are transferred (for example, the confidence score is greater than the threshold value), a location of where to store the filtered images locally, and/or a location of where to store the filtered images remotely. Examples of ML filter models include those that perform object recognition, activity detection, facial recognition, etc.

Once filtered, these images are labeled using the label service 115 (or engine) at circle 4. In some embodiments, when the use case is known, ML domain knowledge of the computing device(s) 121 is used to automatically recommend how many images should be collected and labeled to build a satisfactory model. This information is used to inform the image capturing and filtering detailed above. Examples of parameters to be configure the label service 115 (or engine) include one or more of: identifying a labeling problem type/use case (such as bounding box, image classification, text classification, and/or semantic segmentation), an indication of a location of images to label, an indication of a location to store labeled images (or the labels with a pointer to the images), etc. Note in some embodiments, the label service 115 (or engine) requires at least a proper subset of the images to be manually labeled.

A ML model is trained using the labeled images using the ML model training service 120 (or engine) at circle 5. Model training is naturally an iterative process, but often the machine learning expertise to identify what training parameters need to be changed between iterations to improve machine learning models is lacking. In some embodiments, the model training service 120 reduces the training cycles by automatically tuning the hyperparameters (such as the number of epochs, learning rate, etc.), using the best model architecture (such as SSD, ResNet), and potentially using transfer learning using an existing ML model. Examples of parameters to be configure the ML model training service 120 (or engine) include one or more of: an identification of what framework is used to build the model (e.g., MXNet, TensorFlow, PyTorch, etc.), a base model (if transfer learning is used), a model type (such as ResNet, SSD, etc.), hyperparameters, an indication of what hyperparameters to use (and tune), what hardware instances to use, and/or an indication of where to store a resulting model.

In some embodiments, the ML model training service 120 (or engine) performs model optimization to target a trained model to a particular hardware platform. For example, the trained model is targeted toward a particular CPU, GPU, or APU. Examples of parameters to be configure the ML model training service 120 (or engine) to optimize a trained include one or more of: what framework was used to build the model, where to save the optimized model, and an indication of what the target is.

The model development service 107 may also be used to deploy a trained (and in some cases optimized) model. For example, the model development service 107 may deploy the trained model 135 in a ML model hosting system 140 at circle 6A or in one or more local compute device(s) 142 at circle 6B.

The above acts may be repeated multiple times for various reasons. First, it is often unknown how many images are enough for a "successful" ML model and more images may have to be gathered to improve the ML model. Second, when hardware changes (such as the image/capture device(s) 141), the ML models, trained using different cameras may start to underperform with the new cameras during inference, since ML models are sensitive to changes in camera positioning, lighting, image quality, field of view (FOV), resolution etc.

The model development service 107 may use one or more programmable parameters to decide when to end this loop such as a model accuracy threshold (e.g., shown by the accuracy meeting a threshold), a budgeting threshold, a model accuracy improvement plateau (e.g., shown by the accuracy improvement being minimal), or simply a given time window.

Figure 3:
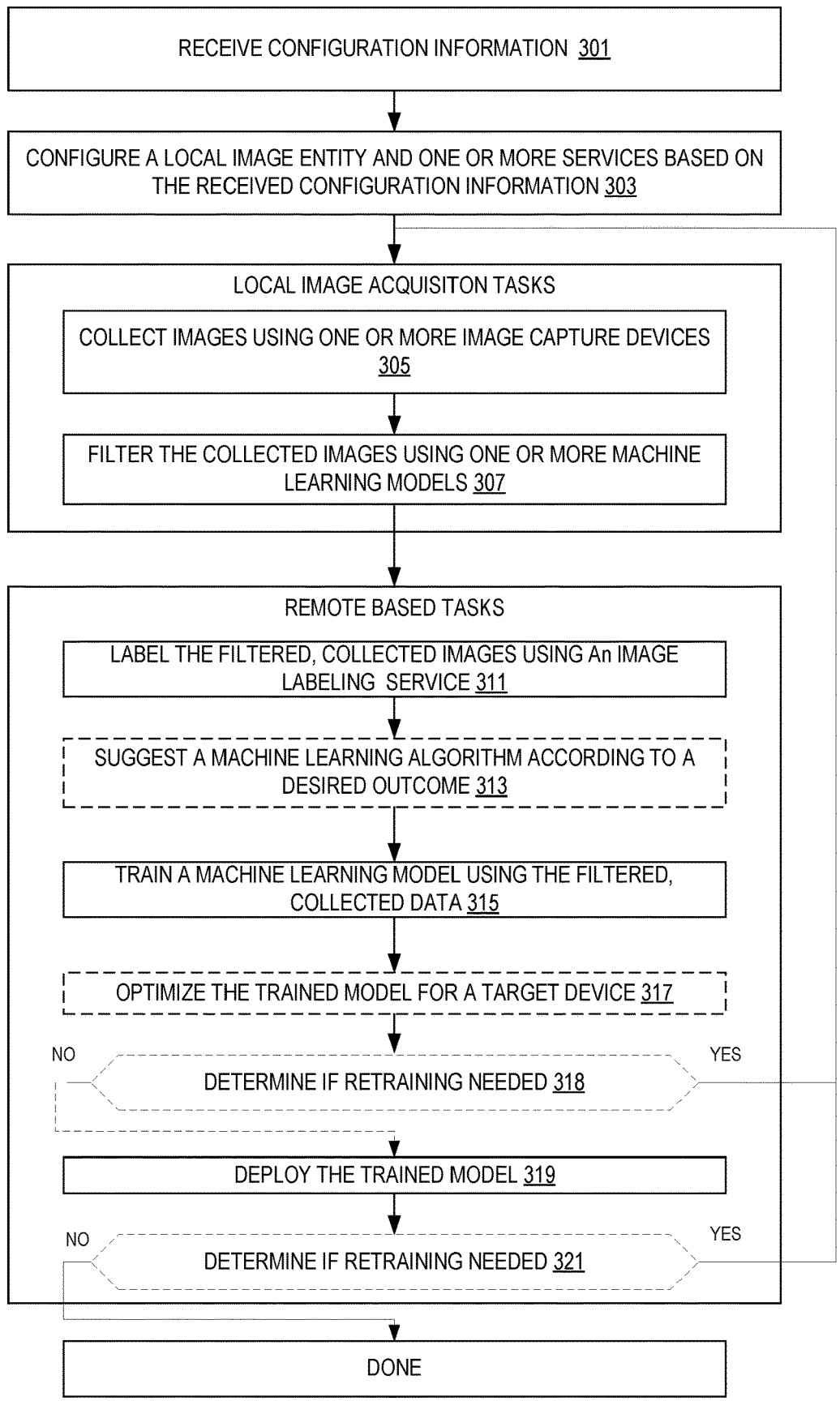
FIG. 3 is a flow diagram illustrating operations of a method for image collection, image filtering, image labeling, ML model training, and deployment according to some embodiments.

FIG. 3 is a flow diagram illustrating operations of a method for image collection, image filtering, image labeling, ML model training, and deployment according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by services or engines of the other figures.

At 301, configuration information to be used by a model development service 107 is received. As noted above, there are many different services and/or engines that may need to be configured for use to perform one or more operations and the model development service 107 may be used to perform that configuration.

One or more services (or engines) and a local image entity are configured based upon the received configuration information. For example, the image/video capture device(s) 141 may be configured to capture images are set rate, resolution, etc.; a local compute device 142 may be configured to filter captured images according to a set of received parameters, etc. at 303.

With at least the image/video capture device(s) 141 configured, local image acquisition tasks are performed. At 305, images using one or more image capture devices are collected. In this flow, these images are collected for training, however, once a model is deployed, the images could be used for inference and/or training. For example, a captured image may be subjected to an inference using a ML model and then used as a part of a re-training of that ML model.

The collected images are filtered using one or more machine learning models at 307. The filtering may occur in the image/video capture device(s) 141 or other local compute device(s) 142.

One or more remote based tasks are performed after the filtering of the collected images and subsequent remote transfer. In some embodiments, filtered images are inspected for quality. For example, blurry, dark, or spotty images may be deleted. In some instances, one or more of the filter images are pre-processed (e.g., a change of one or more of brightness, contrast, white balance, sharpness, aspect ratio, image size, etc.).

A task is to label the filtered, collected images using an image labeling service at 311. In some embodiments, the labeling is based upon a provided use case and domain knowledge. In some embodiments, labeled images are inspected to remove erroneous labels or delete poorly labels completely.

In some embodiments, a machine learning algorithm according to a desired outcome is suggested at 313. For example, if the desired outcome is for object recognition, an available existing algorithm for this desired outcome is suggested. The suggestion may be based on one or more of cost, user feedback, previous accuracy, etc.

A machine learning model is trained using the filtered, collected data at 315. This model may be based on a suggested algorithm, a provided algorithm, or from an existing model.

In some embodiments, the trained model is optimized for a target device at 317. For example, the trained model may be optimized for a particular processor model, memory usage, accelerator, etc.

A determination of if re-training is needed pre-deployment is made at 318 in some embodiments. For example, if the trained model is not producing a result within an accuracy threshold, the local image entity may be directed to capture more images to be used in training.

At 319, the trained (and potentially optimized) model is deployed. This deployment to be within the remote system (such as in a provider network) or at an edge device.

A determination of if re-training is needed post-deployment is made at 312 in some embodiments. For example, if the deployed model is not producing an inference result within an accuracy threshold, the local image entity may be directed to capture more images to be used in training.

Figure 4:
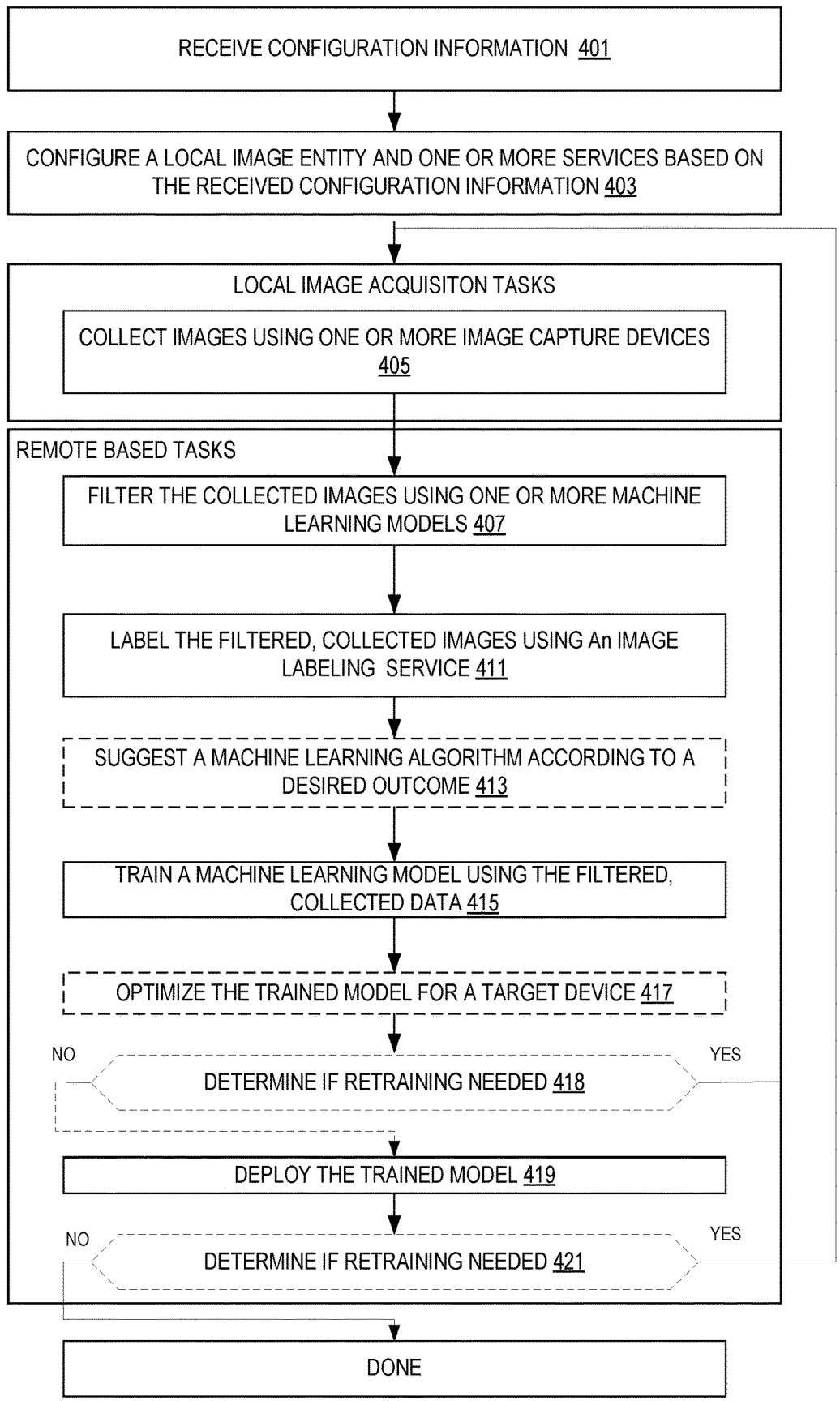
FIG. 4 is a flow diagram illustrating operations of a method for image collection, image filtering, image labeling, ML model training, and deployment according to some embodiments.

FIG. 4 is a flow diagram illustrating operations of a method for image collection, image filtering, image labeling, ML model training, and deployment according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by services or engines of the other figures.

At 401, configuration information to be used by a model development service 107 is received. As noted above, there are many different services and/or engines that may need to be configured for use to perform one or more operations and the model development service 107 may be used to perform that configuration.

One or more services (or engines) and a local image entity are configured based upon the received configuration information. For example, the image/video capture device(s) 141 may be configured to capture images are set rate, resolution, etc.; a local compute device 142 may be configured to filter captured images according to a set of received parameters, etc. at 403.

With at least the image/video capture device(s) 141 configured, local image acquisition tasks are performed. At 405, images using one or more image capture devices are collected. In this flow, these images are collected for training, however, once a model is deployed, the images could be used for inference and/or training. For example, a captured image may be subjected to an inference using a ML model and then used as a part of a re-training of that ML model.

One or more remote based tasks are performed after the collection of the images. In some embodiments, filtered images are inspected for quality. For example, blurry, dark, or spotty images may be deleted. In some instances, one or more of the filter images are pre-processed (e.g., a change of one or more of brightness, contrast, white balance, sharpness, aspect ratio, image size, etc.).

For example, the collected images are filtered using one or more machine learning models at 407.

A subsequent task is to label the filtered, collected images using an image labeling service at 411. In some embodiments, the labeling is based upon a provided use case and domain knowledge. In some embodiments, labeled images are inspected to remove erroneous labels or delete poorly labels completely.

In some embodiments, a machine learning algorithm according to a desired outcome is suggested at 413. For example, if the desired outcome is for object recognition, an available existing algorithm for this desired outcome is suggested. The suggestion may be based on one or more of cost, user feedback, previous accuracy, etc.

A machine learning model is trained using the filtered, collected data at 415. This model may be based on a suggested algorithm, a provided algorithm, or from an existing model.

In some embodiments, the trained model is optimized for a target device at 417. For example, the trained model may be optimized for a particular processor model, memory usage, accelerator, etc.

A determination of if re-training is needed pre-deployment is made at 418 in some embodiments. For example, if the trained model is not producing a result within an accuracy threshold, the local image entity may be directed to capture more images to be used in training.

At 419, the trained (and potentially optimized) model is deployed. This deployment to be within the remote system (such as in a provider network) or at an edge device.

A determination of if re-training is needed post-deployment is made at 412 in some embodiments. For example, if the deployed model is not producing an inference result within an accuracy threshold, the local image entity may be directed to capture more images to be used in training.

Figure 5:
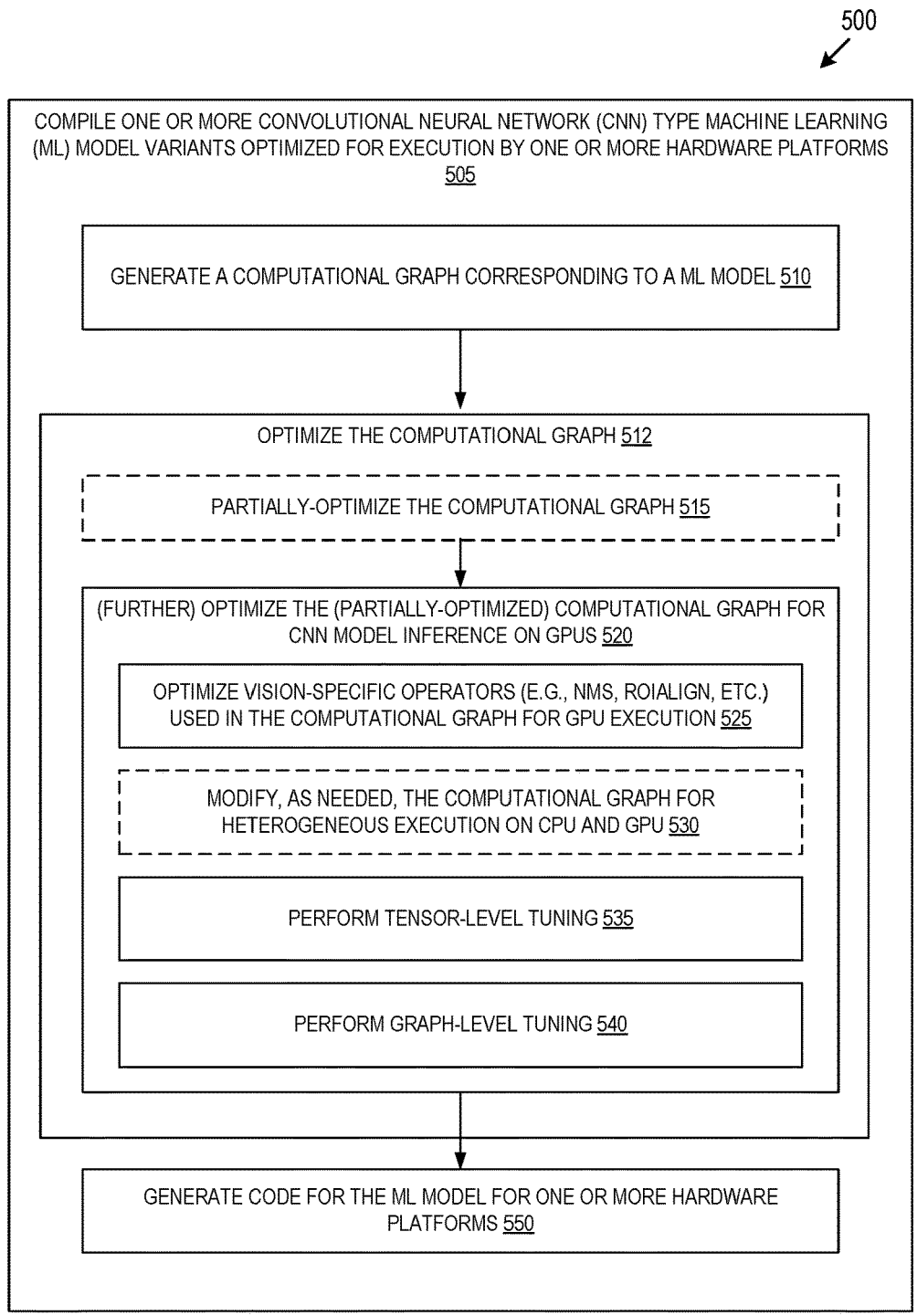
FIG. 5 is a flow diagram illustrating operations of a method for optimizing convolutional neural network models for inference according to some embodiments.

FIG. 5 is a flow diagram illustrating operations of a method for optimizing convolutional neural network models for inference according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the are performed by the model training system 120.

The operations include, at block 505, compiling one or more convolutional neural network (CNN) type machine learning (ML) model variants optimized for execution by one or more hardware platforms.

The operations include, at block 510, generating a computational graph corresponding to a ML model.

At block 512, the operations further include, optimizing the computational graph. Block 512 optionally includes block 515 and partially optimizing the computational graph. For example, block 515 may include performing a set of one or more optimization techniques such as, but not limited to, performing operator fusion, tiling (e.g., separating a computation into small blocks for better data reuse), packing (e.g., performing a re-layout of the input matrices according to the tiling to enable more sequential memory access, which reduces cache miss rate), loop unrolling, vectorization, etc. At block 520, the operations include (further) optimizing the (partially optimized) computational graph for CNN model inference on GPUs, which includes one or more (or all) of optimizing vision-specific operators (e.g., NMS, ROIAlign, etc.) used in the computational graph for GPU execution at block 525, optionally modifying, as needed, the computational graph for heterogeneous execution on CPU and GPU at block 530, and performing tensor-level tuning at block 535 and graph-level tuning at block 540.

At block 550, the operations further include, generating code for the ML model for one or more hardware platforms 550.

Figure 6:
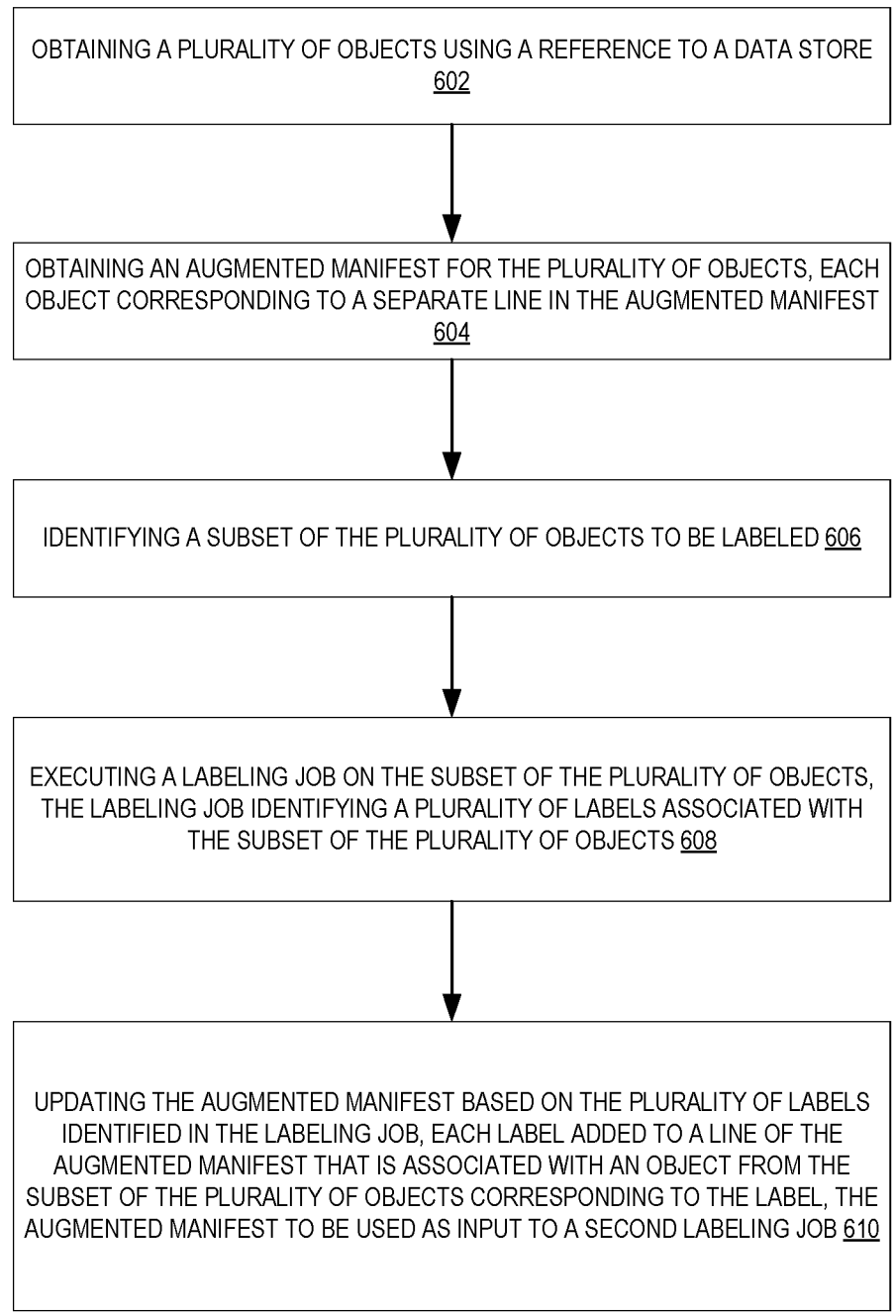
FIG. 6 is a flow diagram illustrating operations of a method for active learning-based data labeling according to some embodiments.

FIG. 6 is a flow diagram illustrating operations of a method for active learning-based data labeling according to some embodiments. Some or all of the operations (other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by labeling service 115.

The operations include, at block 602, obtaining a plurality of objects using a reference to a data store. In some embodiments, receiving a reference can include receiving credentials to read the plurality of objects and the augmented manifest. The operations include, at block 604, obtaining an augmented manifest for the plurality of objects, each object corresponding to a separate line in the augmented manifest. In some embodiments, the plurality of objects includes a reference to at least one of a video, an image, a multi-dimensional vector, text data, or a human-generated label. In some embodiments, obtaining an augmented manifest for the plurality of objects, each object corresponding to a separate line in the augmented manifest further comprises reading the augmented manifest from the data store, and indexing each line of the augmented manifest.

The operations include, at block 606, identifying a subset of the plurality of objects to be labeled. In some embodiments, obtaining the augmented manifest may include identifying a plurality of files of a data type in the data store, the plurality of files associated with the plurality of objects, extracting metadata from the plurality of files, and generating the augmented manifest in the data store based on the metadata. In some embodiments, identifying a subset of the plurality of objects to be labeled further comprises executing a query on the augmented manifest to identify the subset, wherein the query includes a filtering condition executed on the augmented manifest to filter the plurality of objects. In some embodiments, identifying a subset of the plurality of objects to be labeled further comprises randomly sampling the plurality of objects using a large dataset sampling technique.

The operations include, at block 608, executing a labeling job on the subset of the plurality of objects, the labeling job identifying a plurality of labels associated with the subset of the plurality of objects. In some embodiments, the query includes a select statement executed on the augmented manifest to filter the plurality of objects.

The operations include, at block 610, updating the augmented manifest based on the plurality of labels identified in the labeling job, each label added to a line of the augmented manifest that is associated with an object from the subset of the plurality of objects corresponding to the label, the augmented manifest to be used as input to a second labeling job. In some embodiments, each object is defined in the augmented manifest without using a preamble or post-script to define boundaries of the object in the augmented manifest. In some embodiments, updating the augmented manifest based on the plurality of labels identified in the labeling job, further comprises identifying a line of the augmented manifest corresponding to a first label from the plurality of labels, and writing the first label to the line of the augmented manifest using the byte offset indexed for that line.

In some embodiments, the operations may further include storing intermediate results of the labeling job, the intermediate results including at least one of job statistics, annotations obtained during the labeling job, labels, worker states, or object metadata. In some embodiments, the operations may further include combining the plurality of objects and the plurality of labels into a new output dataset and storing the new output dataset and a new augmented manifest in an output data store. In some embodiments, the new augmented manifest includes changes corresponding to the labeling job and a reference to the plurality of objects.

In some embodiments, the operations may include receiving a reference to a data store and credentials to access the data store, identifying text data in the data store, the text data including a plurality of objects, obtaining an augmented manifest for the text data, each object from the plurality of objects corresponding to a separate line in the augmented manifest, executing a labeling job on a subset of the plurality of objects, the subset of the plurality of objects identified by running a query on the augmented manifest, the labeling job identifying a plurality of labels associated with the subset of the plurality of objects, adding the plurality of labels to the augmented manifest to generate a new augmented manifest, each label added in-line with its corresponding object, the augmented manifest to be used as input to a second labeling job, and storing an output dataset and the new augmented manifest in an output data store.

Figure 7:
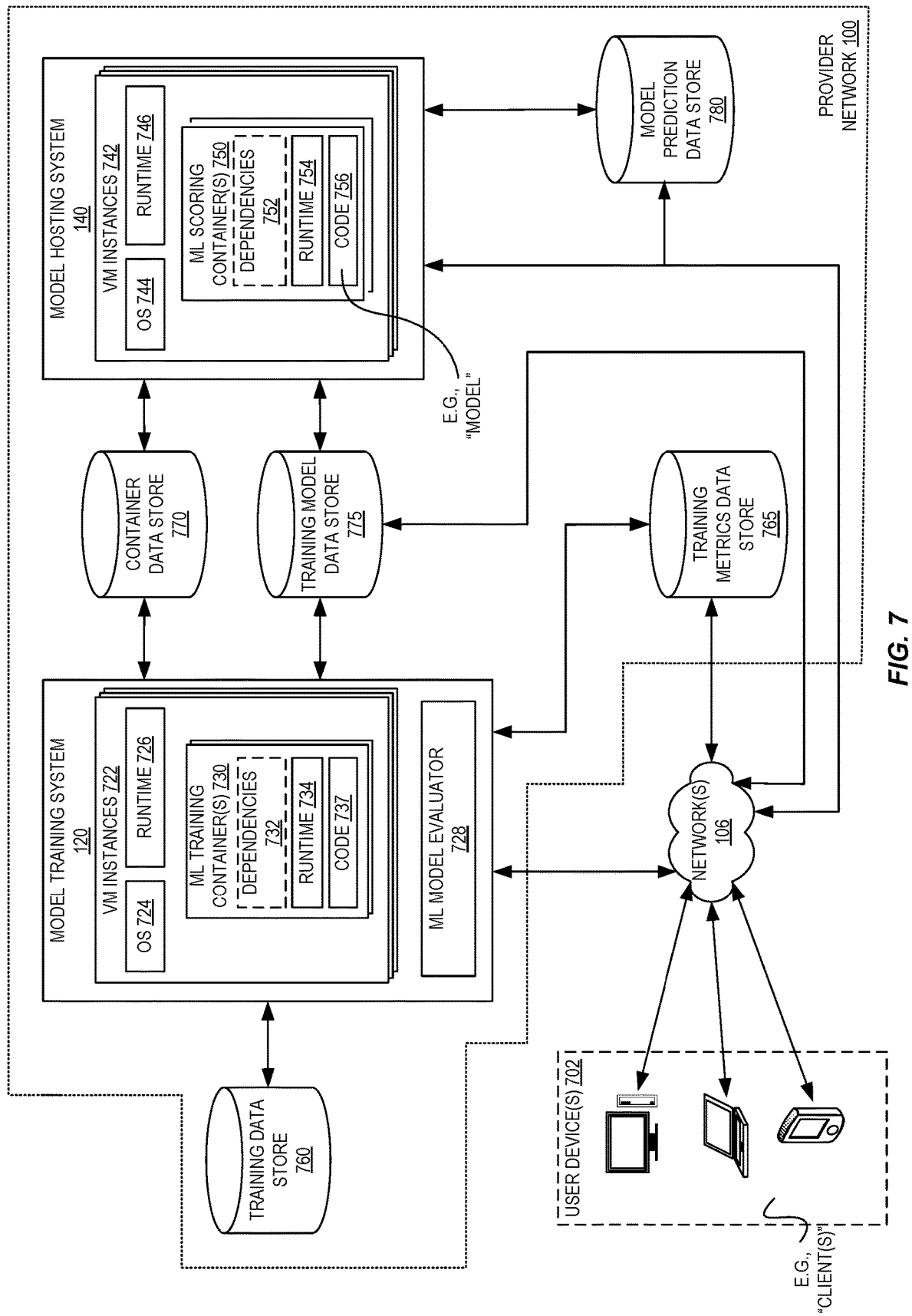
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, computing devices(s) 121, edge device(s) 1141, 142), a model training system 120, a model hosting system 140, a training data store 760, a training metrics data store 765, a container data store 770, a training model data store 775, and a model prediction data store 780.

In some embodiments, users, by way of user devices 702, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 702 and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 120 via frontend 729 of the model training system 120. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 120 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for training a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (for example, containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 120 uses one or more container images included in a training request (or a container image retrieved from the container data store 770 in response to a received training request) to create and initialize a ML training container 730 in a virtual machine instance 722. For example, the model training system 120 creates a ML training container 730 that includes the container image(s) and/or a top container layer.

Prior to beginning the training process, in some embodiments, the model training system 120 retrieves training data from the location indicated in the training request. For example, the location indicated in the training request can be a location in the training data store 760. Thus, the model training system 120 retrieves the training data from the indicated location in the training data store 760. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 120 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 120 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 120 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 120 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 120 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data, and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model training process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively, or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend 749 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend 749 in some embodiments. A deployment request causes the model hosting system 140 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend 749, where the execution request identifies an endpoint and includes an input to a machine learning model (for example, a set of input data). The model hosting system 140 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively, or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 120. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 140. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 120 and the model hosting system 140, this is not meant to be limiting. For example, in some embodiments not shown, the training data store 760 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (for example, execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long-Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

FIG. 8 illustrates embodiments of a graphical user interface (GUI) to be used to configure image filtering. In some embodiments, this GUI 801 is presented by the model development service 107 to get configuration settings for the filtering to be performed (such as configuring ML filter models). As shown, the GUI 801 allows a user to select a filtering condition 803. In particular, the user may choose to use one of a plurality of filtering types/conditions such as using: a time interval 811 (e.g., capture a frame every X seconds where X is user definable); using a custom model 813 (e.g., using a user provided model); or using one or more pre-defined models such as one for feature detection 815, one for object detection 817, one for person/animal detection 818, and/or one for motion detection 819. Note that a custom model may also perform feature, object, person/animal, and/or motion detection.

FIG. 9 illustrates embodiments of a GUI to be used to configure image filtering. In some embodiments, this GUI 901 is presented by the model development service 107 to get configuration settings for the filtering to be performed (such as configuring ML filter models). As shown, the GUI 901 allows a user to input parameters for a filtering condition 803. In particular, in this example, the selected filtering condition 903 is object detection. The classes to detect may be selected or input using input mechanism 911. Additionally, in some embodiments, a mechanism 909 for inputting parameters other aspects of the condition is provided. In this example, a confidence threshold is input. In some embodiments, a user may add another condition using input mechanism 905 or create a package (e.g., a package containing the model, etc.) using input mechanism 907.

Figure 10:
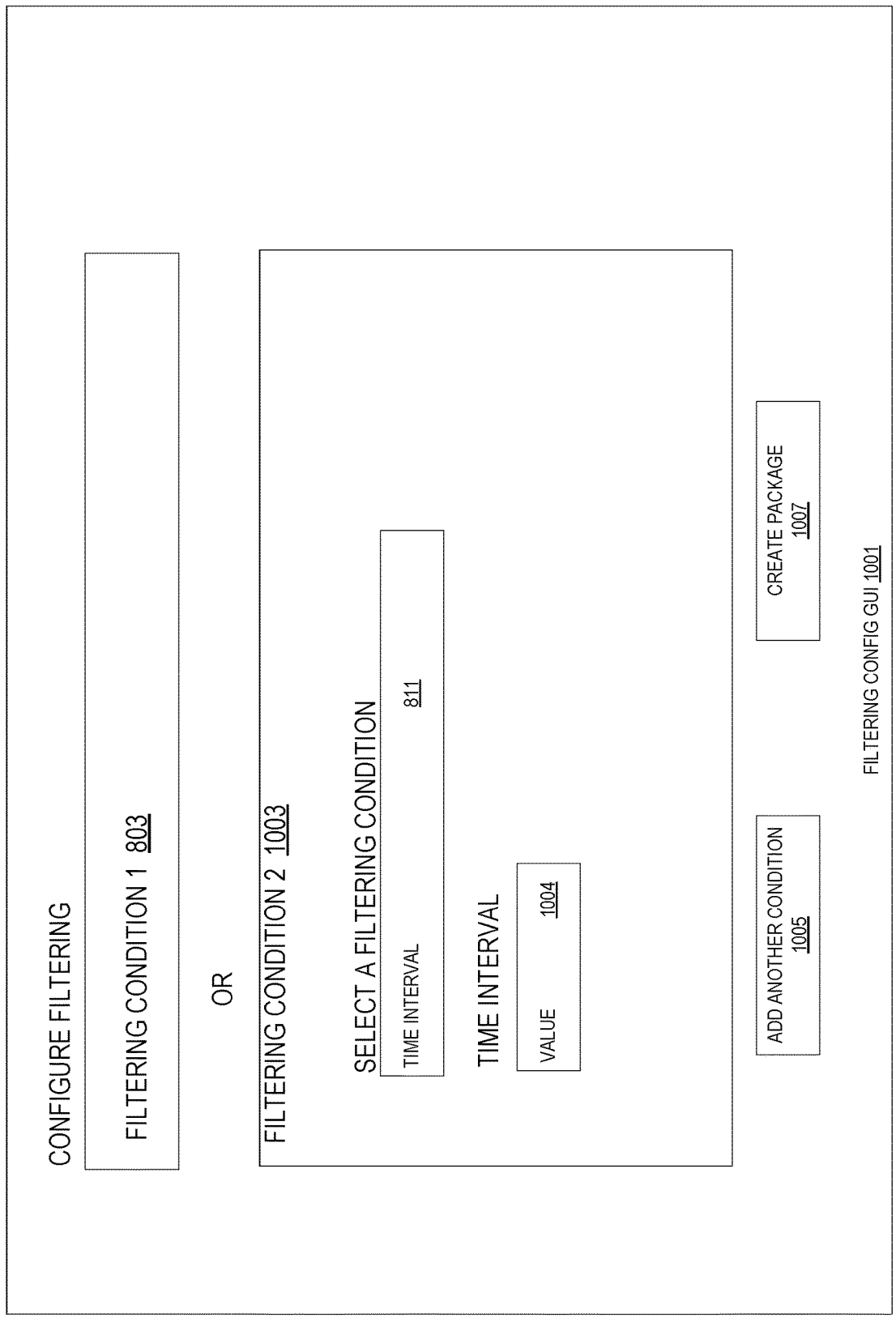
FIG. 10 illustrates embodiments of a GUI to be used to configure a second image filtering mechanism.

FIG. 10 illustrates embodiments of a GUI to be used to configure a second image filtering mechanism. In some embodiments, this GUI 1001 is presented by the model development service 107 to get configuration settings for the filtering to be performed (such as configuring ML filter models). As shown, the GUI 1001 allows a user to input parameters for a filtering condition 1003. In particular, in this example, the selected filtering condition 1003 is using a time interval 811. The time interval value may be input using input mechanism 1004. Additionally, in some embodiments, other mechanisms for inputting parameters other aspects of the condition is/are provided. In this example, a confidence threshold is input. In some embodiments, a user may add another condition using input mechanism 1005 or create a package (e.g., a package containing the model, etc.) using input mechanism 1007.

FIG. 11 illustrates embodiments of a GUI to be used to configure a package. In some embodiments, this GUI 1101 is presented by the model development service 107 to get configuration settings for packaging. As shown, the GUI 1101 allows a user to input parameters for a package. In particular, in this example, a storage location path 1105 for the storage of input images may be defined, along with the filtering conditions 1107 used in the package. Additionally, a model may be created or identified using input mechanism 1109. In some embodiments, a package is a reusable building block that defines a certain function. Packages define references to relevant artifacts such as remote function calls, models, label files, etc.

FIG. 12 illustrates embodiments of a GUI to be used to configure a model. In some embodiments, this GUI 1200 is presented by the model development service 107 to get configuration settings for the configuration of a model usage. As shown, the GUI 1200 allows a user to input parameters for a model. In particular, in this example, a model may be named using input mechanism 1205 and a description of the model supplied via input mechanism 1207.

Figure 13:
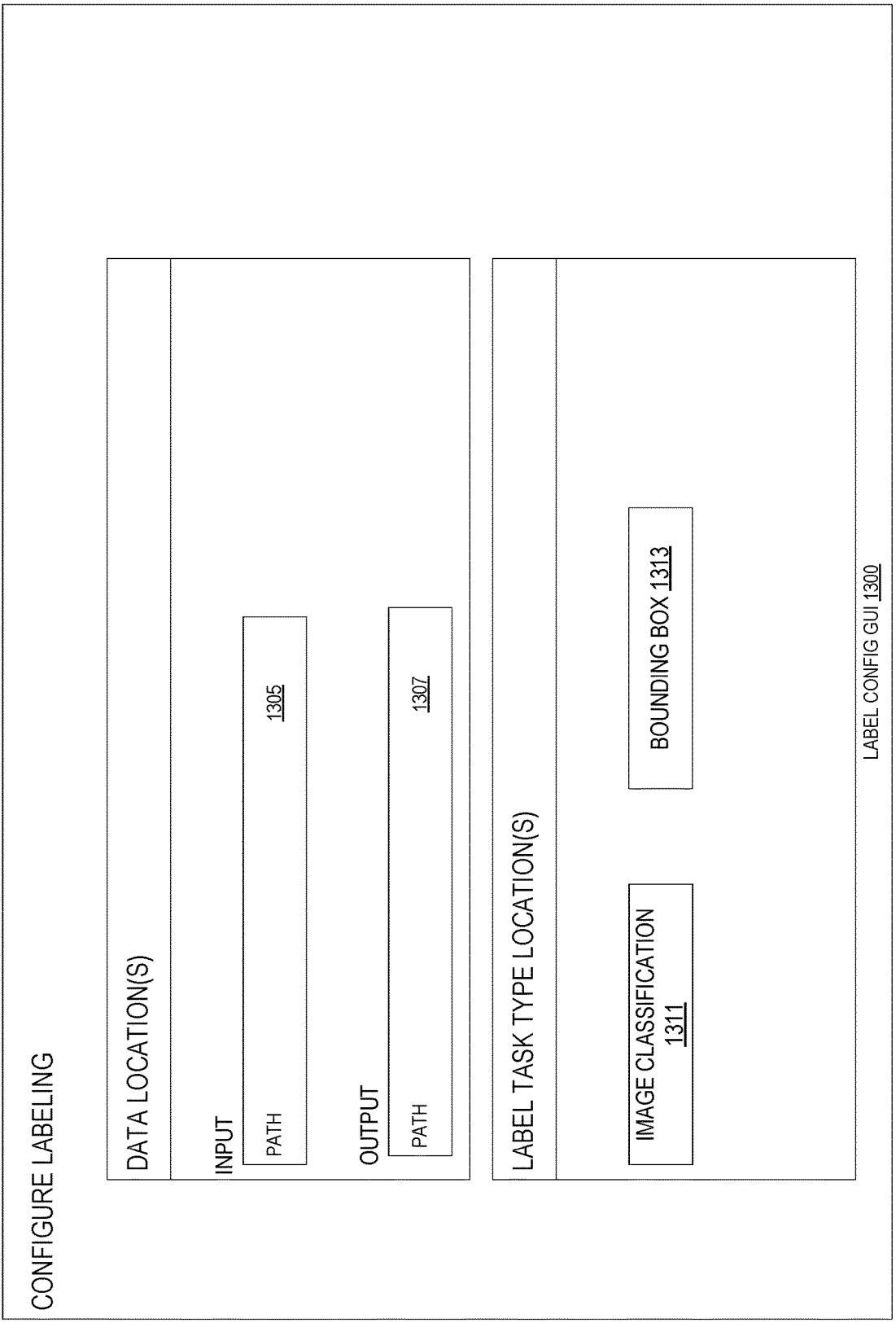
FIG. 13 illustrates embodiments of a GUI to be used to configure a labeling service.

FIG. 13 illustrates embodiments of a GUI to be used to configure a labeling service. In some embodiments, this GUI 1300 is presented by the model development service 107 to get configuration settings for a label service. As shown, the GUI 1300 allows a user to input parameters for a storage path for input images 1305 and a storage path for output, labeled images 1307. Additionally, a user may select a label task to be performed such as image classification 1311 or bounding box 1313.

Figure 14:
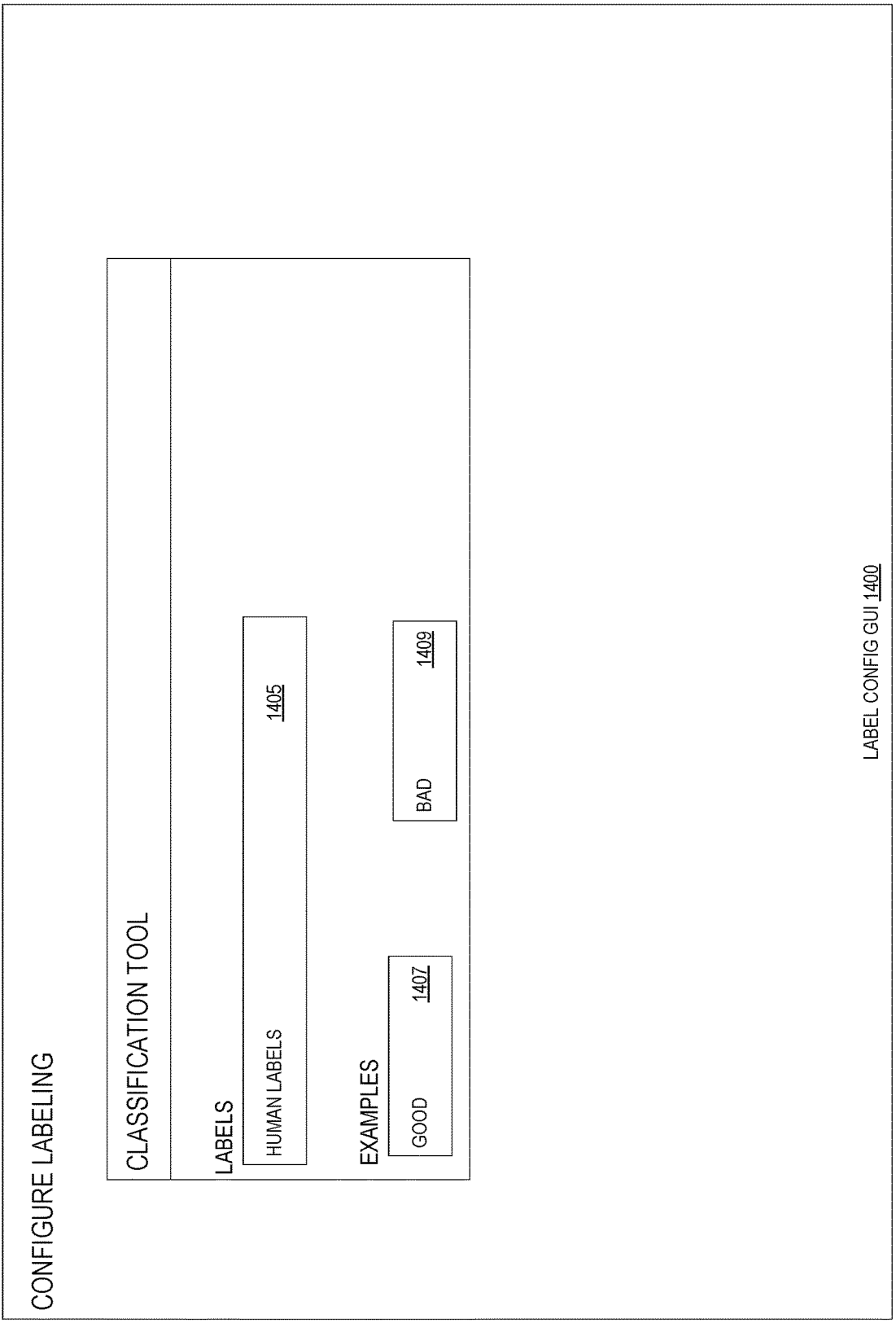
FIG. 14 illustrates embodiments of a GUI to be used to configure a labeling service.

FIG. 14 illustrates embodiments of a GUI to be used to configure a labeling service. In some embodiments, this GUI 1400 is presented by the model development service 107 to get configuration settings for a label service. As shown, the GUI 1400 allows a user to input parameters for a storage path for human labeled images 1405 and examples of good labels 1407 and bad labels 1409.

Figure 15:
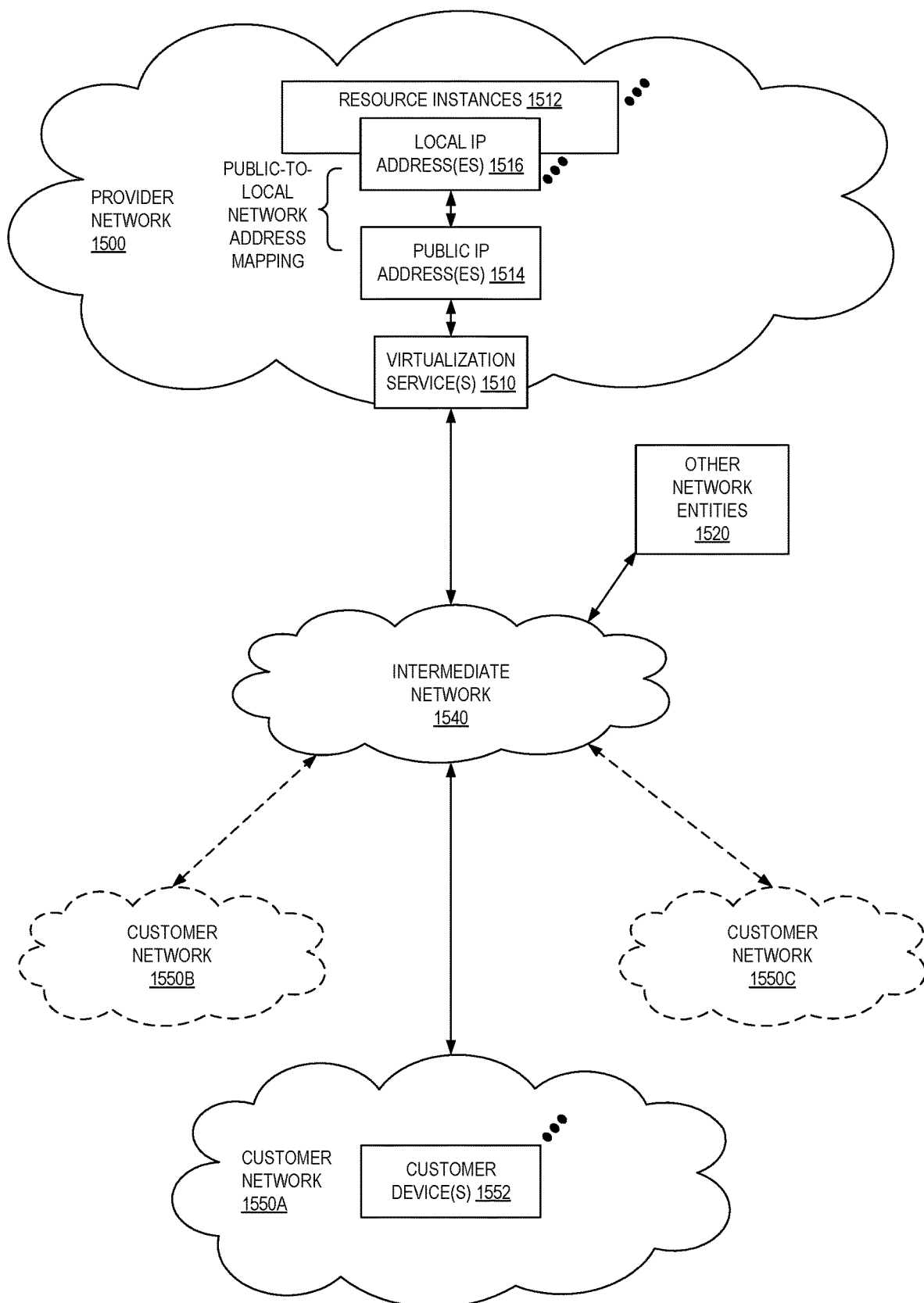
FIG. 15 illustrates an example provider network environment according to some embodiments.

FIG. 15 illustrates an example provider network (or "service provider system") environment according to some embodiments. A provider network 1500 may provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 may be associated with the resource instances 1512; the local IP addresses are the internal network addresses of the resource instances 1512 on the provider network 1500. In some embodiments, the provider network 1500 may also provide public IP addresses 1514 and/or public IP address ranges (e.g., Internet Protocol version 4 (IPv4) or Internet Protocol version 6 (IPv6) addresses) that customers may obtain from the provider 1500.

Conventionally, the provider network 1500, via the virtualization services 1510, may allow a customer of the service provider (e.g., a customer that operates one or more client networks 1550A-1550C including one or more customer device(s) 1552) to dynamically associate at least some public IP addresses 1514 assigned or allocated to the customer with particular resource instances 1512 assigned to the customer. The provider network 1500 may also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of customer network(s) 1550A-1550C may, for example, implement customer-specific applications and present the customer's applications on an intermediate network 1540, such as the Internet. Other network entities 1520 on the intermediate network 1540 may then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 may be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1500; a customer may then assign their allocated public IP addresses to particular resource instances allocated to the customer.

These public IP addresses may be referred to as customer public IP addresses, or simply customer IP addresses. Instead of being assigned by the provider network 1500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
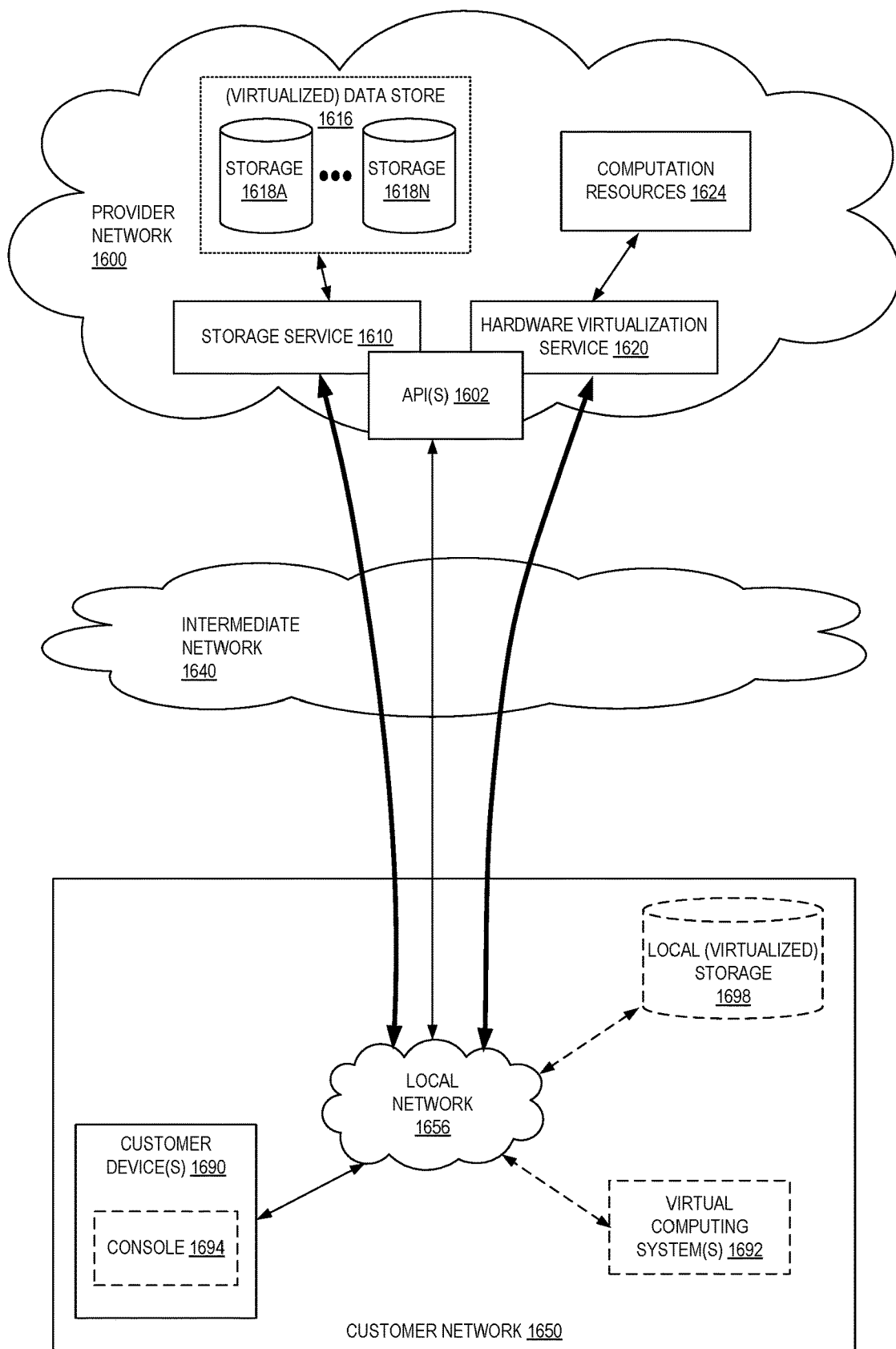
FIG. 16 is a block diagram of an example provider network that provides a storage service and a hardware virtualization service to customers according to some embodiments.

FIG. 16 is a block diagram of an example provider network that provides a storage service and a hardware virtualization service to customers, according to some embodiments. Hardware virtualization service 1620 provides multiple computation resources 1624 (e.g., VMs) to customers. The computation resources 1624 may, for example, be rented or leased to customers of the provider network 1600 (e.g., to a customer that implements customer network 1650). Each computation resource 1624 may be provided with one or more local IP addresses. Provider network 1600 may be configured to route packets from the local IP addresses of the computation resources 1624 to public Internet destinations, and from public Internet sources to the local IP addresses of computation resources 1624.

Provider network 1600 may provide a customer network 1650, for example coupled to intermediate network 1640 via local network 1656, the ability to implement virtual computing systems 1692 via hardware virtualization service 1620 coupled to intermediate network 1640 and to provider network 1600. In some embodiments, hardware virtualization service 1620 may provide one or more APIs 1602, for example a web services interface, via which a customer network 1650 may access functionality provided by the hardware virtualization service 1620, for example via a console 1694 (e.g., a web-based application, standalone application, mobile application, etc.). In some embodiments, at the provider network 1600, each virtual computing system 1692 at customer network 1650 may correspond to a computation resource 1624 that is leased, rented, or otherwise provided to customer network 1650.

From an instance of a virtual computing system 1692 and/or another customer device 1690 (e.g., via console 1694), the customer may access the functionality of storage service 1610, for example via one or more APIs 1602, to access data from and store data to storage resources 1618A-1618N of a virtual data store 1616 (e.g., a folder or "bucket", a virtualized volume, a database, etc.) provided by the provider network 1600. In some embodiments, a virtualized data store gateway (not shown) may be provided at the customer network 1650 that may locally cache at least some data, for example frequently-accessed or critical data, and that may communicate with storage service 1610 via one or more communications channels to upload new or modified data from a local cache so that the primary store of data (virtualized data store 1616) is maintained. In some embodiments, a user, via a virtual computing system 1692 and/or on another customer device 1690, may mount and access virtual data store 1616 volumes via storage service 1610 acting as a storage virtualization service, and these volumes may appear to the user as local (virtualized) storage 1698.

Figure 17:
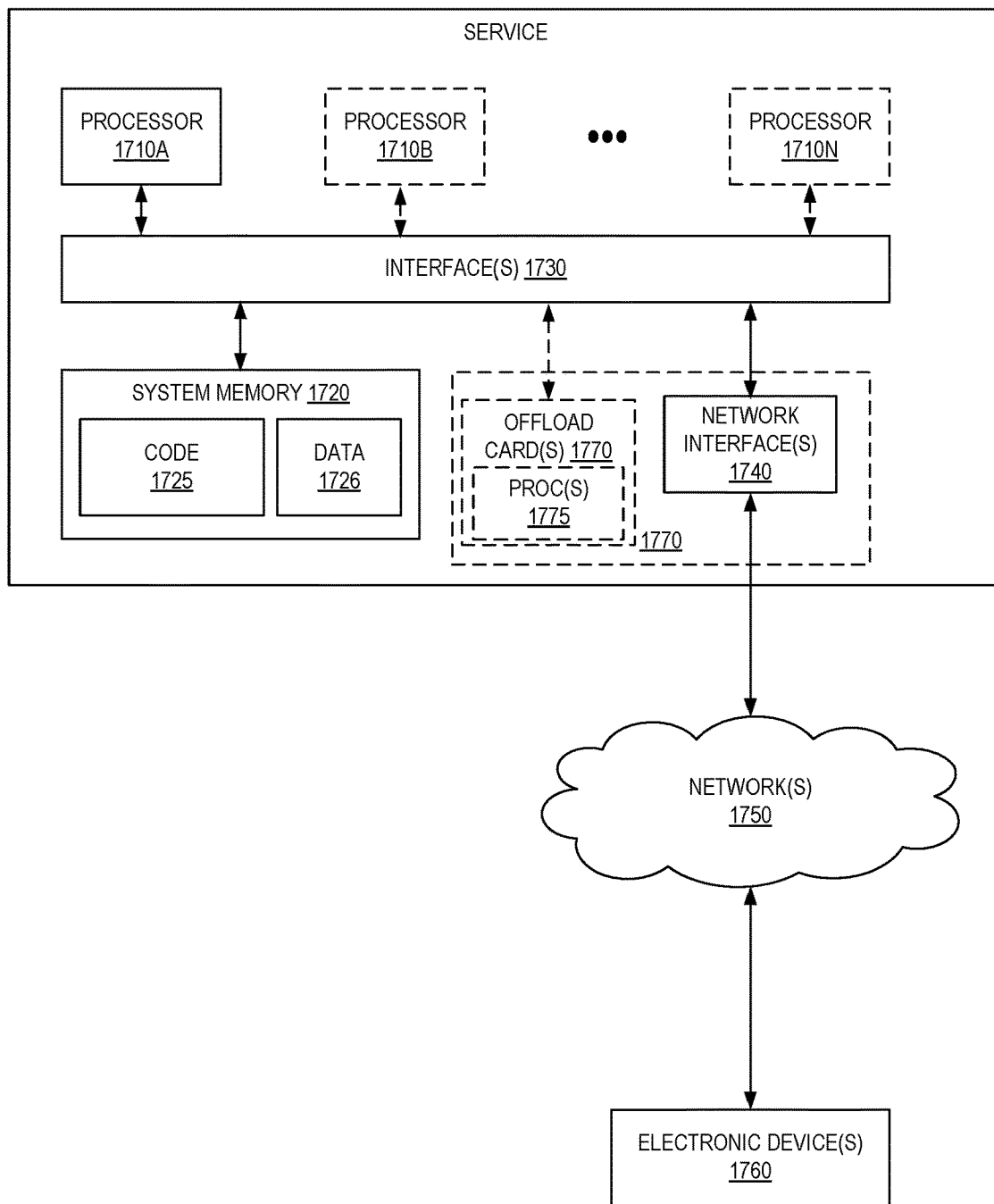
FIG. 17 is a block diagram illustrating an example computer system that may be used in some embodiments.

While not shown in FIG. 16, the virtualization service(s) may also be accessed from resource instances within the provider network 1600 via API(s) 1602. For example, a customer, appliance service provider, or other entity may access a virtualization service from within a respective virtual network on the provider network 1600 via an API 1602 to request allocation of one or more resource instances within the virtual network or within another virtual network.
Illustrative Systems In some embodiments, a system that implements a portion or all of the techniques described herein may include a general-purpose computer system that includes or is configured to access one or more computer-accessible media, such as computer system 1700 illustrated in FIG. 17. In the illustrated embodiment, computer system 1700 includes one or more processors 1710 coupled to a system memory 1720 via an input/output (I/O) interface 1730. Computer system 1700 further includes a network interface 1740 coupled to I/O interface 1730. While FIG. 17 shows computer system 1700 as a single computing device, in various embodiments a computer system 1700 may include one computing device or any number of computing devices configured to work together as a single computer system 1700.

In various embodiments, computer system 1700 may be a uniprocessor system including one processor 1710, or a multiprocessor system including several processors 1710 (e.g., two, four, eight, or another suitable number). Processors 1710 may be any suitable processors capable of executing instructions. For example, in various embodiments, processors 1710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1710 may commonly, but not necessarily, implement the same ISA.

System memory 1720 may store instructions and data accessible by processor(s) 1710. In various embodiments, system memory 1720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1720 as code 1725 and data 1726.

In one embodiment, I/O interface 1730 may be configured to coordinate I/O traffic between processor 1710, system memory 1720, and any peripheral devices in the device, including network interface 1740 or other peripheral interfaces. In some embodiments, I/O interface 1730 may perform any necessary protocol, timing, or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example.

Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices 1760 attached to a network or networks 1750, such as other computer systems or devices as illustrated in FIG. 1, for example. In various embodiments, network interface 1740 may support communication via any suitable wired or wireless general data networks, such as types of Ethernet network, for example. Additionally, network interface 1740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1700 includes one or more offload cards 1770 (including one or more processors 1775, and possibly including the one or more network interfaces 1740) that are connected using an I/O interface 1730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1700 may act as a host electronic device (e.g., operating as part of a hardware virtualization service) that hosts compute instances, and the one or more offload cards 1770 execute a virtualization manager that can manage compute instances that execute on the host electronic device. As an example, in some embodiments the offload card(s) 1770 can perform compute instance management operations such as pausing and/or un-pausing compute instances, launching and/or terminating compute instances, performing memory transfer/copying operations, etc. These management operations may, in some embodiments, be performed by the offload card(s) 1770 in coordination with a hypervisor (e.g., upon a request from a hypervisor) that is executed by the other processors 1710A-1710N of the computer system 1700. However, in some embodiments the virtualization manager implemented by the offload card(s) 1770 can accommodate requests from other entities (e.g., from compute instances themselves), and may not coordinate with (or service) any separate hypervisor.

In some embodiments, system memory 1720 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1700 via I/O interface 1730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1700 as system memory 1720 or another type of memory. Further, a computer-accessible medium may include transmission media or signals such as electrical, electromagnetic, or digital signals, conveyed via a communication medium such as a network and/or a wireless link, such as may be implemented via network interface 1740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1618A-1618N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   collecting images using a camera to generate collected images;
   filtering the collected images using one or more machine learning models to generate filtered, collected images;
   transmitting the filtered, collected images to a provider network;
   labeling the filtered, collected images using a data labeling service of the provider network;
   training a machine learning model using the filtered, collected images using a model development service of the provider network to generate a trained model;
   optimizing the trained model for a target device using the model development service of the provider network to generate a trained, optimized model; and
   causing deployment of the trained, optimized model onto the target device.

2. The computer-implemented method of claim 1, further comprising:
   suggesting a machine learning algorithm to train into the machine learning model based upon a desired outcome and the filtered, collected images.

3. The computer-implemented method of claim 1, wherein the trained, optimized model is deployed outside of the provider network.

4. A computer-implemented method comprising:
   filtering a first set of collected images using one or more machine learning models to generate a first set of filtered, collected images;
   labeling the first set of filtered, collected images using a data labeling service of a provider network to generate a first set of labeled, filtered, collected images;
   training a machine learning model from a machine learning algorithm using the first set of labeled, filtered, collected images using a model development service of the provider network to generate a trained machine learning model; and causing deployment of the trained machine learning model onto a device.

5. The computer-implemented method of claim 4, wherein the filtering of collected images is performed using a service of a provider network.

6. The computer-implemented method of claim 4, wherein the filtering of collected images is performed outside of the provider network under control of a service of the provider network.

7. The computer-implemented method of claim 4, wherein the trained machine learning model is deployed external to the provider network.

8. The computer-implemented method of claim 4, wherein the trained machine learning machine learning model is deployed in the provider network.

9. The computer-implemented method of claim 4, wherein the machine learning algorithm is an image classification algorithm.

10. The computer-implemented method of claim 4, wherein the machine learning algorithm is an object detection algorithm.

11. The computer-implemented method of claim 4, further comprising:
    optimizing the trained machine learning model for a particular device configuration prior to deployment.

12. The computer-implemented method of claim 4, further comprising:
    receiving one or more parameters to configure one or more services to perform the labeling the first set of filtered, collected images using the data labeling service, the training a machine learning model from a machine learning algorithm using the first set of filtered, collected images, and the causing deployment of the trained model onto the target device; and
    configuring the one or more provider network services based on the received parameters.

13. The computer-implemented method of claim 4, further comprising:
    suggesting the machine learning algorithm to be trained based on a desired outcome and the filtered, collected images.

14. The computer-implemented method of claim 4, further comprising:
    filtering a second, different set of collected images using the one or more machine learning models;
    labeling the second, different set of filtered, collected images using the data labeling service; and
    re-training the machine learning model using the second, different set of filtered, collected images.

15. A system comprising:
    an image capture device to capture a plurality of images; and
    a model development service implemented by one or more electronic devices, the model development service including instructions that upon execution cause the model development service to invoke one or more other services to:
        filter, using one or more machine learning models, a first set of collected images provided by the image capture device to generate a first set of filtered, collected images,
        label the first set of filtered, collected images to generate a first set of labeled, filtered, collected images,
        train a machine learning model from a machine learning algorithm using the first set of labeled, filtered, collected images to generate a trained machine learning model, and
        cause deployment of the trained machine learning model onto a device.

16. The system of claim 15, wherein the trained machine learning model is deployed external to the provider network.

17. The system of claim 15, wherein the machine learning algorithm is one of an image classification algorithm and an object detection algorithm.

18. The system of claim 15, wherein the model development service is further to invoke a service to optimize the trained machine learning model for the device.

19. The system of claim 15, wherein the model development service is to be configured based upon received parameters for the services it is to invoke.

20. The system of claim 15, wherein the model development service is to re-train the machine learning model when the trained machine learning model does not have a desired accuracy.

* * * * *